April 8, 1941.  C. SCHMUTZER  2,237,637
PURGING AIR FROM CARBONATED BEVERAGE CONTAINERS
Filed June 2, 1939  2 Sheets-Sheet 1
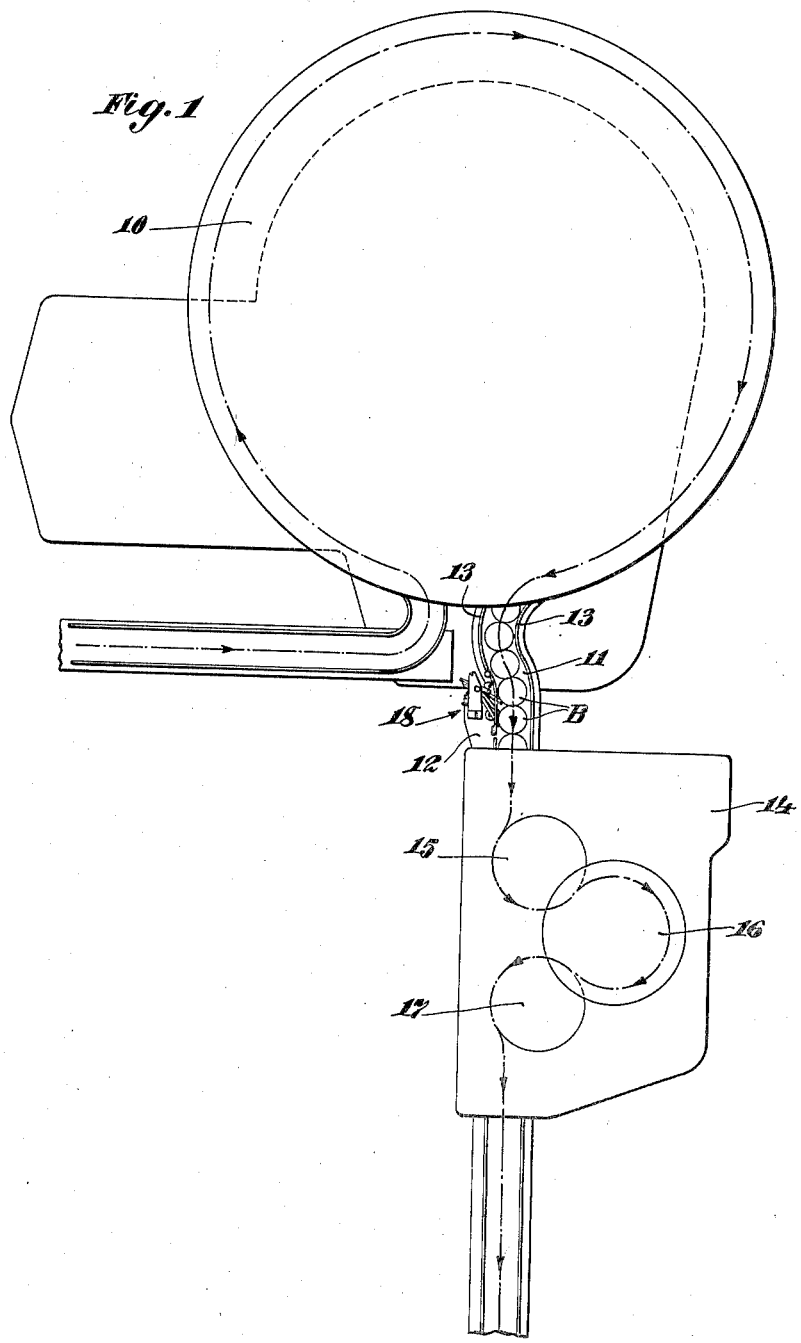
INVENTOR.
Charles Schmutzer,
BY
ATTORNEYS April 8, 1941.                    C. SCHMUTZER                    2,237,637
PURGING AIR FROM CARBONATED BEVERAGE CONTAINERS
Filed June 2, 1939                    2 Sheets-Sheet 2
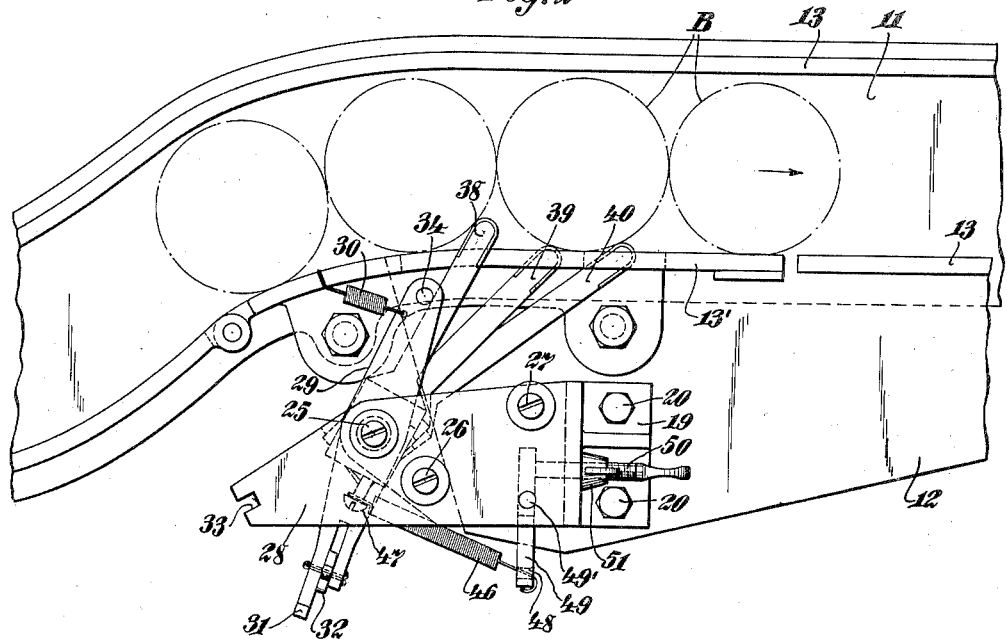
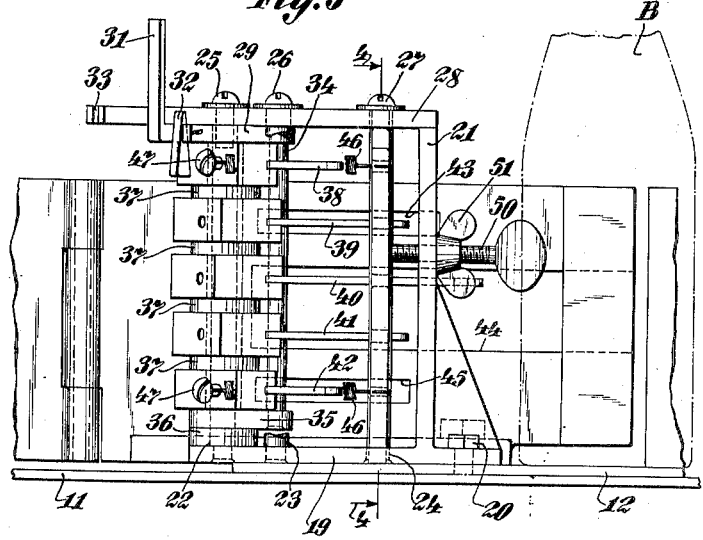
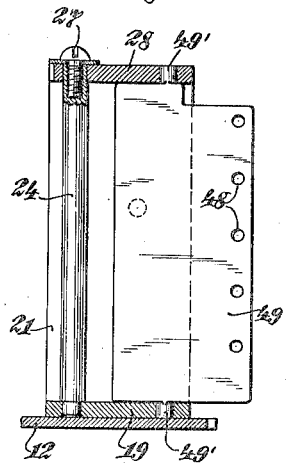
INVENTOR.
Charles Schmutzer,
BY
ATTORNEYS

UNITED STATES PATENT OFFICE 2,237,637

PURGING AIR FROM CARBONATED BEVERAGE CONTAINERS

Charles Schmutzer, Irvington, N. J., assignor to Hoffman Beverage Company, Newark, N. J., a corporation of New Jersey Application June 2, 1939, Serial No. 276,988

8 Claims. (Cl. 226—72)

This invention relates to an improved apparatus and a method for purging air from partially-filled carbonated beverage containers prior to sealing the same.

Carbonated beverages containing organic material, such as flavored carbonated soft drinks, fermented beverages containing carbon dioxide, and the like, are frequently adversely affected in flavor by oxidation of their organic material content by the oxygen in the air trapped in the space between the surface of the beverage in the container and the seal. This air enters the container during or immediately after filling of its liquid content and remains in the container after the container is sealed in the usual way. Subjection of the filled containers to heat, such as during the pasteurizing process of beer, or when the containers are stored in a hot place, appears to augment the oxidation in the beverage and increase the flavor impairment. Elimination of this condition has been sought by attempting to remove this air from the container at some point between the filling and sealing operations, either by squirting a jet of the beverage into the container to induce foaming, or supplying carbon dioxide to the container to displace the air, but neither of these expedients has proven to be very satisfactory in actual practice.

Another method of purging the air from carbonated beverage containers involves jarring the beverage in the container to cause it to liberate sufficient carbon dioxide to expel at least part of the air from the container, and then promptly sealing the container. This method, and apparatus for conducting the method, are disclosed in my copending application Serial No. 152,736, filed July 9, 1937, and while this method has proven to be very satisfactory, the apparatus heretofore devised for that purpose has certain limitations due to the condition of the beverage being treated, i. e., in some cases insufficient gas is liberated and in other instances too much gas is liberated to produce uniform results.

In accordance with this invention, air is purged from a partially filled container of a carbonated beverage prior to sealing the same, according to an improvement in the aforementioned jarring method to induce liberation of air-expelling gas, whereby all forms of carbonated beverages, regardless of their condition, degree of carbonation, and the like, may be uniformly treated. More particularly, the apparatus of this invention comprises a plurality of tapping fingers or arms of different lengths, each being provided with a tension spring, so that when the arms are retracted and then released, the springs cause the arms to engage the container at different points and at different times by reason of their varying lengths, and preferably with different degrees of force, although each impact is relatively gentle. Preferably, the arms are retracted and released by the leading container for engagement with the following container, as the containers are conveyed from the filling machine to the sealing machine.

Thus, the arms, engaging the surface of the container in quick succession, agitate the beverage so as to cause it to release corresponding successive small charges of its carbon dioxide content, each charge beginning with a visible burst of small bubbles at some point in the body of the beverage which spreads substantially to the whole body of the beverage. The resulting gas bubbles rise to the surface, break and release their gas, which rises to the top of the container and thus expels at least part of the air therein. By adjusting the fingers or arms, the degree of force applied by each of them may be varied at will, and consequently their action is accommodated to the nature or degree of carbonation of the beverage, so that, when the release of gas is accompanied by foaming, no beverage is lost by overfoaming. Also, the impact of any individual finger is not sufficient to cause requisite air expulsion, but their cumulative effect releases the proper amount of gas to the lip of the container for adequate air-purging purposes.

For a more complete understanding of the invention, reference may be had to the accompanying drawings, in which:

Figure 1 is a diagrammatic illustration in plan of a more or less conventional layout of receptacle filling, capping, and conveyor mechanism equipped with the apparatus of this invention;

Fig. 2 is an enlarged plan view of the apparatus of this invention;

Fig. 3 is a side elevation thereof; and,

Fig. 4 is a vertical section through the apparatus as seen along the line 4—4 of Fig. 3.

Referring to Fig. 1 of the drawings, numeral 10 designates a filling machine of more or less conventional form for filling bottles, cans, or other receptacles with a beverage or other liquid in which carbon dioxide or other gas is dissolved, occluded, or otherwise entrained. In the filling machine 10, the gas containing liquid, such as beer, for example, is customarily filled into bottles B within a few inches of the lip thereof and the bottles are advanced by the filling machine 10 in close proximity or in contact with each other to a chain type conveyor 11, which advances them between guide rails 13 to the sealing machine 14, which may be of conventional form for applying crown caps or the like to the bottles B. A conventional crown cap applying machine 14 includes an inlet turret 15 and a rotary capping head 16, and a discharge turret 17.

Positioned adjacent the conveyor 11, such as on the apron of platform 12 thereof, is the apparatus of this invention, which is generally designated 18 in Fig. 1. In the arrangement illustrated in Fig. 1, the apparatus 18 is positioned approximately two feet from the rotary capping head 16 and may be adjustable relatively thereto in the manner illustrated in said copending application.

As shown in Figs. 2, 3 and 4, the apparatus 18 includes a base plate 19 secured by bolts or screws 20 to the conveyor apron 12 opposite the curved conveyor guide shoe 13' and having the vertical web 21. Riveted to base 19 and extending upwardly therefrom are three vertical rods 22, 23 and 24 whose free lengths are each equal to the length of vertical web 21. Secured to the upper ends of rods 22, 23 and 24 by respective cap screws 25, 26 and 27, is a horizontal top plate 28 resting on the upper end of web 21, as shown particularly in Fig. 3. Journalled on rod 22 immediately under top plate 28 is an elongated horizontal bar 29 connected at one end by spring 30 to the guide shoe 13' and having an upwardly extending handle 31 at its other end, which is fitted with a pivoted pawl 32 for engagement in a notch 33 in the free end of top plate 28. Thus, when bar 29 is swung in a clockwise direction about rod 22, as seen in Fig. 2, pawl 32 may engage in notch 33 so as to hold bar 29 in the swung position against the tension of spring 30. The inner end of bar 29 is connected by vertical pin 34 to a lower plate 35 journalled on rod 22 over a washer 36, so that as bar 29 is moved, plate 35 is turned with it about rod 22 by reason of its connection to bar pin 29 by pin 34.

Journalled on rod 22 between bar 29 and plate 35 and spaced from each other by washers 37, are five fingers or arms 38, 39, 40, 41 and 42, which normally extend into the path of movement of the bottles B as they are carried along by the conveyor 11, as shown in Fig. 2. The upper arm 38 extends over the top of guide shoe 13'. Arm 39 extends through a slot 43 in shoe 13', arms 40 and 41 extend through elongated slot 44 in shoe 13', while the lower arm 42 extends through slot 45 in shoe 13'. It will be observed that upper and lower arms 38 and 42 are of equal length and relatively short, and that center arm 40 is relatively long, whereas the intermediate arms 39 and 41, though of equal length, are longer than arms 38 and 42 but shorter than center arm 40. The tips of the arms 38 and 42 are rounded, as seen in plan, and the edges thereof are round or bevelled, as shown particularly in Fig. 2.

A spring 46 is connected at one end to a screw 47 in the hub of each arm 38 to 42 inclusive, and at its other end in a corresponding aperture 48 in a vertical plate 49 having end extensions 49' pivoted in plates 28 and 19 for movement about a vertical axis, as shown in Fig. 4. Threaded through vertical web 21 is a thumb screw 50 with its tip engaging the surface of the pivotal plate 49 at a point opposite the connection between the several springs 46 and the plate 49. The springs 46 accordingly urge their respective arms 38 to 42 inclusive in a counter-clockwise direction, as shown in Fig. 2.

The limit of the movement of the arms 38 to 42, inclusive, when there are no bottles B on the conveyor 11 for engagement with the arms, is determined by the vertical rod 34 extending between bar 29 and plate 35. The degree of pressure applied by arms 38 to 42 may be adjusted by means of thumb screw 50 which rotates plate 49 about its vertical axis to effect such adjustment in a manner readily understood. The thumb screw 50 is locked in adjusted position by wing nut 51. The springs 46 are preferably identical, but they may have different degrees of tension in accordance with requirements, and the tension is relatively light for each of the corresponding arms 38 to 42.

It will be observed that all of the arms 38 to 42 may be swung out of the path of the bottles B merely by grasping handle 31 and swinging bar 29 and plate 35, so that the vertical pin 34 moves all of the arms 38 to 42 simultaneously in a clockwise direction. By engaging pawl 32 with notch 33, the arms 38 to 42 may be held out of the path of the bottles B. Normally, when the apparatus of this invention is in operation, pawl 32 is disengaged from notch 33 with spring 30 holding bar 29 and plate 35 in the position shown in Fig. 2.

In operation of the apparatus of this invention, partially filled bottles B of carbonated beverage are discharged from filling machine 10, and, by reason of their partial filling, the space above the level of the beverage contains air, which enters during or after the filling operation. The partially filled bottles B are discharged in contact or in close proximity with each other upon the conveyor 11, which moves them toward the capping machine 14. In their course between the filling machine 10 and the capping machine 14, the first or leading bottle B engages the arms 38 to 42 substantially simultaneously, and retracts them as the bottle advances, thereby tensioning their corresponding springs 46. Inasmuch as the long arm 40 is retained longest by the bottle, it is retracted through the greatest angle and consequently its spring 46 is tensioned to a greater degree than the springs 46 of the shorter intermediate arms 39 and 41, while the latter are retracted further than the short arms 38 and 42 with consequent greater degree of tension in the springs 46 than in the springs of the short arms 38 and 42.

As the leading bottle B, retracting the arms in the manner described, continues to advance, the tips of the arms slide over the surface of the leading bottle and are accordingly released therefrom, trigger-fashion, the short arms 38 and 42 being released before the intermediate arms 39 and 41, and the latter being released before the longer arm 40. The short arms 38 and 42, being of the same length, simultaneously engage the succeeding bottle and apply a light tap thereto under the relatively light tension of their corresponding springs 46. The lower short arm 42 engages the bottle near its lower end and the upper short arm 38 engages the bottle adjacent the shoulder thereof, as shown in Fig. 3. The tap applied to the bottle wall by short arms 38 and 42, causes the carbonated beverage in the bottle to be jarred, so that a very small amount of carbon dioxide is released from the body of the beverage initially at some point in the beverage, as evidenced by a visible burst of bubbles, and then in response to the jar the whole body of the beverage releases a further small amount of gas.

Immediately after the short arms 38 and 42 engage the bottle B, intermediate arms 39 and 41 are released and simultaneously engage the wall of the bottle at spaced points and apply a tap thereto, which is of slightly greater impact than the prior tap applied by arms 38 and 42, by reason of the greater tensioning of corresponding springs of intermediate arms 39 and 41. However, the same action takes place, namely, the liberation of carbon dioxide from the beverage in the bottle B initially at local points in the body of the beverage, the amount of the gas being liberated being greater than that liberated by the tap of short arms 38 and 42 by reason of the greater degree of impact. The result of the impact then causes the whole body of the beverage to release more gas.

Finally, the long arm 40 is released by the leading bottle and engages the succeeding bottle with a smart tap, determined by the greater tension of its spring 46. The position of the long arm 40 is substantially near the center of the body of the beverage in the bottle B and consequently a greater volume of gas is liberated from the beverage than was liberated by reason of the taps applied by the short and intermediate arms. Each succeeding bottle, after being tapped, retracts the arms for engagement with the next bottle.

All of the gas liberated at successive intervals by reason of the successive taps applied to each bottle, forms a myriad of bubbles which rise to the surface of the beverage in the bottle, some of which accumulate there at approximately the same time by reason of the different vertical positions of the tapping arms 38 to 42. However, distinct taps are applied, the short arms delivering the first tap, the intermediate arms the second tap, and the long arm the third tap, and each tap is accompanied by liberation of some gas, so that there are intially successive liberations of gas at different points, although each local gas charge liberation is immediately followed by a general liberation of gas from the whole body of the beverage, in response to the jar. The upper short arm starts the gas-liberating action, being nearer the surface, while the liberated gas near the bottom of the container by the simultaneous tap of the lower short arm, begins to rise and is met by the gas liberated by the intermediate and long arms, so that the gas bubbles reach the surface in a more or less continuous stream over a period of a few seconds, releasing their gas which accumulates and rises to the lip of the bottle to expel the air.

In the case of relatively high surface tension beverages, like beer, the gas reaching the surface of the beverage forms foam, which rises to the lip of the bottle with substantially no, or very little, over-foaming, so that none of the beverage is lost. Even with a highly carbonated beverage, the successive gentle taps are applied by the various arms in such a manner as to avoid a sudden or violent liberation of gas, which might take place in a highly carbonated beverage if but one tap were applied to its container with sufficient force to cause the requisite gas release. With beverages of low surface tension there is little or no foaming.

By adjusting the tension of springs 46 by means of thumb screw 50, the degree of impact of the several arms 38 to 42 may be varied to accommodate the nature or degree of carbonation of the beverage to be treated. The rise of the gas to the lip of the bottle B accordingly purges air therefrom and while the gas still extends to the lip of the bottle, it is immediately sealed in a capping machine 14, so that the beverage is sealed substantially in the absence of air, and thus cannot be subsequently deteriorated by reason of oxidation of its organic constituents. Five arms, arranged and projected against the bottle in the manner described, have proven satisfactory, but the number and arrangement of the arms may vary with different beverages, and so long as the impacts thereof result in the successive release of small charges of gas in the beverage body, so as to cause a practically continuous gentle evolution of the gas at the surface of the beverage for a proper period to cause the gas to accumulate to the lip of the bottle by the time the cap is applied, the operation will remain satisfactory.

It will be seen that very simple and effective methods and apparatus are provided for purging air from partially filled containers of carbonated beverages prior to sealing the same, whereby the air is all or substantially entirely removed from the containers. While the treatment of beverages in bottles has been described by way of illustration of the invention, it will be understood that beverages in cans or other containers may be similarly treated, and that other gas-containing liquids may be treated in the same way when partially filled into a container adapted to be more or less permanently sealed.

Although a preferred embodiment of the apparatus invention has been illustrated and described herein, it is to be understood that the invention is not limited thereby but is susceptible of changes in form and detail within the scope of the appended claims.

I claim:

1. The method of purging air from the space above the liquid level in a partially-filled carbonated beverage container, which comprises jarring with different degrees of violence separate portions of the body of the beverage in the container to cause said portions to initially liberate gas prior to the effect of the continued jarring until the gas rises to the lip of the container for expelling at least part of the air therefrom, and then sealing the container while the gas extends to the lip thereof.

2. The method of purging air from the space above the liquid level in a partially-filled carbonated beverage container, which comprises jarring one portion of the body of the beverage in the container to liberate gas therefrom, then more violently jarring another portion of the body of the beverage in the container to liberate gas therefrom to induce and maintain continued gentle gas liberation at the surface of the liquid until the gas rises to the lip of the container for expelling at least part of the air therefrom, and then sealing the container while the gas extends to the lip thereof.

3. The method of purging air from the space above the liquid level in a partially-filled carbonated beverage container, which comprises jarring the beverage at a point adjacent the level thereof to liberate gas therefrom, again jarring the beverage with a different degree of force at a point spaced from the first point to maintain the gas liberation until the gas rises to the lip of the container for expelling at least part of the air therefrom, and then sealing the container.

4. The method of purging air from the space above the liquid level in a partially-filled carbonated beverage container, which comprises jarring the body of the beverage with different degrees of force to induce and maintain gas liberation therefrom for a period of time sufficient to cause the gas to rise substantially to the lip of the container for expelling at least part of the air therefrom, and then sealing the container.

5. In apparatus for liberating gas from carbonated beverages in containers, the combination of a pathway along which the containers are adapted to move, a plurality of vertically spaced impact members movable about a common axis adjacent said pathway, means normally urging said members into said pathway, to cause them to engage a container moving along said pathway and be retracted and successively released under the influence of said urging means for engagement with different points on a succeeding container moving along said pathway, said engagement of said members at different points on the container inducing and maintaining liberation of gas from said beverage, said liberated gas rising to the surface of the beverage to expel air therefrom and means for engaging and releasably retaining said inpact members out of said pathway.

6. In apparatus for liberating gas from carbonated beverages in containers, the combination of a pathway along which the containers are adapted to move, a plurality of impact members of different lengths adjacent said pathway, means normally urging said members into said pathway for engagement with a container to cause said members to be retracted to different extents and released under the influence of said urging means for successive engagement in different degrees of violence with a container moving along said pathway to jar the beverage for thereby causing liberation of gas from said beverage, said liberated gas rising to the surface of said beverage to expel air therefrom.

7. In apparatus for liberating gas from carbonated beverages in containers, the combination of a pathway along which the containers are adapted to move, a plurality of impact members adjacent said pathway, said members having different lengths, and means for urging said members into said pathway to engage a container, whereby movement of said container causes said members to be retracted and released to tap a succeeding container moving along said pathway to jar the beverage therein for causing liberation of gas therefrom, said arms engaging said containers at different times for maintaining the liberation of the gas up to the lip of the container to expel at least part of the air therefrom.

8. In apparatus for liberating gas from carbonated beverages in containers, the combination of a pathway along which the containers are adapted to move, a plurality of impact members of different lengths adjacent said pathway, and means responsive to the movement of containers along said pathway for causing said members to be projected into said pathway into engagement with successive containers moving therealong for applying corresponding impacts to the surface of each container to cause gas to be liberated from the beverage therein, said liberated gas rising up to the lip of the container for expelling at least part of the air therefrom.

CHARLES SCHMUTZER.